US012506954B2

(12) United States Patent
Chen et al.

(10) Patent No.: US 12,506,954 B2
(45) Date of Patent: Dec. 23, 2025

(54) METHOD AND SYSTEM FOR CORRECTING IMAGE BASED ON SHOT IMAGE

(71) Applicant: HISENSE LASER DISPLAY CO., LTD., Shandong (CN)

(72) Inventors: Xu Chen, Shandong (CN); Dongdong Zhang, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 183 days.

(21) Appl. No.: 18/467,613

(22) Filed: Sep. 14, 2023

(65) Prior Publication Data
US 2024/0007741 A1    Jan. 4, 2024

Related U.S. Application Data

(63) Continuation-in-part of application No. PCT/CN2022/082298, filed on Mar. 22, 2022.

(30) Foreign Application Priority Data

May 25, 2021    (CN) .......................... 202110571992.3

(51) Int. Cl.
H04N 23/60    (2023.01)
H04N 9/31    (2006.01)
H04N 23/63    (2023.01)

(52) U.S. Cl.
CPC ........... *H04N 23/64* (2023.01); *H04N 9/3179* (2013.01); *H04N 23/635* (2023.01)

(58) Field of Classification Search
CPC .... H04N 23/64; H04N 9/3179; H04N 23/635; H04N 9/3161; H04N 9/3185;
(Continued)

(56) References Cited

U.S. PATENT DOCUMENTS 7,982,793 B2 *    7/2011    Wills ................... H04N 9/3129
                                                              348/333.1
10,262,220 B1 *    4/2019    Pribble ................ G06T 7/0002
(Continued)

FOREIGN PATENT DOCUMENTS

CN    107509066 A    12/2017
CN    207117843 U    3/2018
(Continued)

OTHER PUBLICATIONS

International Search Report received in International Application No. PCT/CN2022/082298, dated Jun. 20, 2022, in 3 pages.

*Primary Examiner* — Ahmed A Berhan
(74) *Attorney, Agent, or Firm* — Knobbe, Martens, Olson & Bear, LLP

(57) ABSTRACT

Provided is a method for correcting an image. In the method, the shooting device displays a preview picture, wherein the preview picture at least includes frames of a projection screen and a projected image; the shooting device displays adjustment prompt information in response to at least two of the frames of the projection screen in the preview picture being beyond a target region of the preview picture, wherein the adjustment prompt information is configured to instruct to adjust shooting parameters of the camera; the shooting device acquires, in response to a shoot operation, a shot image captured by the camera; the shooting device sends the shot image to a laser projection device; and the laser projection device corrects a projected image for display based on the shot image.

20 Claims, 13 Drawing Sheets

(58) Field of Classification Search
CPC .. H04N 23/633; H04N 23/631; H04N 9/3194; H04N 23/634; H04N 17/00; H04N 23/632
See application file for complete search history.

(56) References Cited

U.S. PATENT DOCUMENTS

| | | | |
|---|---|---|---|
| 11,076,138 B2 * | 7/2021 | Cheng | ................ H04N 9/3185 |
| 2019/0253677 A1 | 8/2019 | Yuan | |
| 2020/0366877 A1 | 11/2020 | Cheng et al. | |

FOREIGN PATENT DOCUMENTS

| | | | |
|---|---|---|---|
| CN | 108337494 A | 7/2018 |
| CN | 109005394 A | 12/2018 |
| CN | 113286134 A | 8/2021 |
| CN | 113286135 A | 8/2021 |

* cited by examiner

METHOD AND SYSTEM FOR CORRECTING IMAGE BASED ON SHOT IMAGE

CROSS-REFERENCE TO RELATED APPLICATION

This application is a continuation in part application of international application No. PCT/CN2022/082298, filed on Mar. 22, 2022, which claims priority to Chinese Patent Application No. 202110571992.3, filed on May 25, 2021 and entitled "IMAGE CORRECTION METHOD AND SHOOTING EQUIPMENT," the disclosure of which are incorporated herein by references in their entireties.

TECHNICAL FIELD

The present disclosure relates to the field of projection display, and in particular, relates to a method and a system for correcting an image.

BACKGROUND

Ultra-short throw laser projection devices are capable of displaying projected images to projection screens.

SUMMARY

In some embodiments of the present disclosure, a method for correcting an image is provided. The method is applicable to a system for correcting an image of a laser projection device. The for correcting the image includes a shooting device and the laser projection device. The shooting device includes a camera. The method includes:
  the shooting device displaying a preview picture, wherein the preview picture at least includes frames of a projection screen and a projected image;
  the shooting device displaying adjustment prompt information in response to at least two of the frames of the projection screen in the preview picture being beyond a target region of the preview picture, wherein the adjustment prompt information is configured to instruct to adjust shooting parameters of the camera;
  the shooting device acquiring, in response to a shoot operation, a shot image captured by the camera;
  the shooting device sending the shot image to a laser projection device; and
  the laser projection device correcting a projected image for display based on the shot image.

In some embodiments of the present disclosure, a system for correcting an image of a laser projection device is provided. The system for correcting the image includes a shooting device and the laser projection device. The shooting device includes a camera, and is configured to:
  display a preview picture, wherein the preview picture at least includes frames of a projection screen and a projected image;
  display adjustment prompt information in response to at least two of the frames of the projection screen in the preview picture being beyond a target region of the preview picture, wherein the adjustment prompt information is configured to instruct to adjust shooting parameters of the camera;
  acquire, in response to a shoot operation, a shot image captured by the camera;
  send the shot image to a laser projection device; and
  the laser projection device is configured to correct a projected image for display based on the shot image by the laser projection device.

BRIEF DESCRIPTION OF DRAWINGS

For clearer description of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, the embodiments of the present disclosure are described in detail hereinafter with reference to the accompanying drawings.

For the ultra-short throw laser projection device, as light is emitted obliquely and upwardly based on principles of projection imaging, a laser beam emitted by an optical engine in the ultra-short throw laser projection device and the projection screen should be strictly aligned, and a slight shift of the ultra-short throw laser projection device may cause deformation or distortion of an image. Where the user accidentally moves the ultra-short throw laser projection device, the projected image projected by the ultra-short throw laser projection device may be beyond the projection screen, such that a display effect of the displayed projected image is poor.

Figure 1:
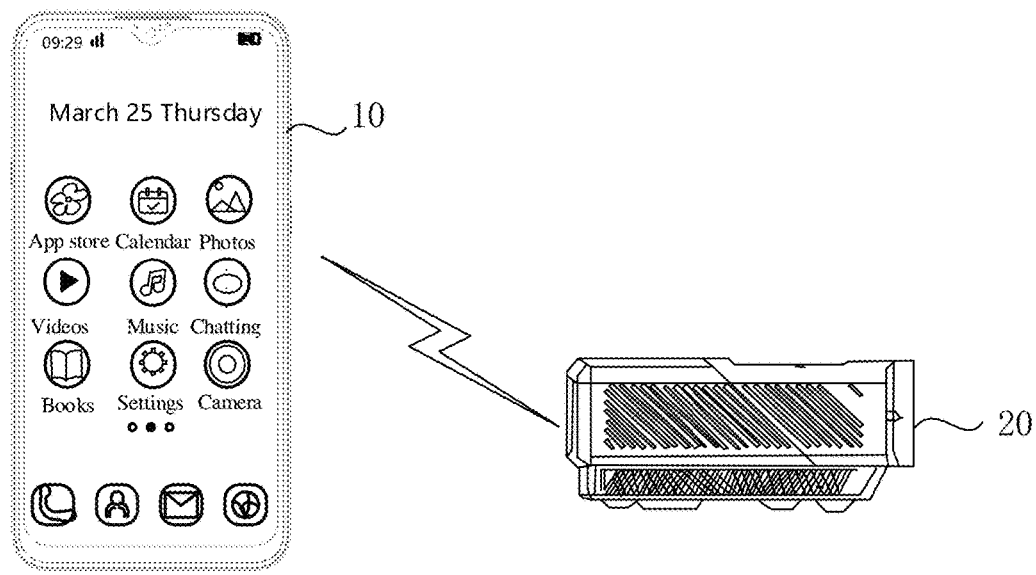
FIG. 1 is a schematic diagram of a system for correcting an image in a method for correcting an image according to some embodiments of the present disclosure.

FIG. 1 is a schematic diagram of a system for correcting an image in a method for correcting an image according to some embodiments of the present disclosure. As shown in FIG. 1, the system for correcting the image includes a shooting device 10 and a laser projection device 20.

The shooting device 10 is a device equipped with a camera. For example, the shooting device 10 is a device equipped with a camera, such as, a mobile phone, a personal computer, a laptop, or a tablet personal computer. The laser projection device 20 is an ultra-short throw laser projection device. The shooting device 10 and the laser projection device 20 are communicated over a wire network or a wireless network.

Figure 2:
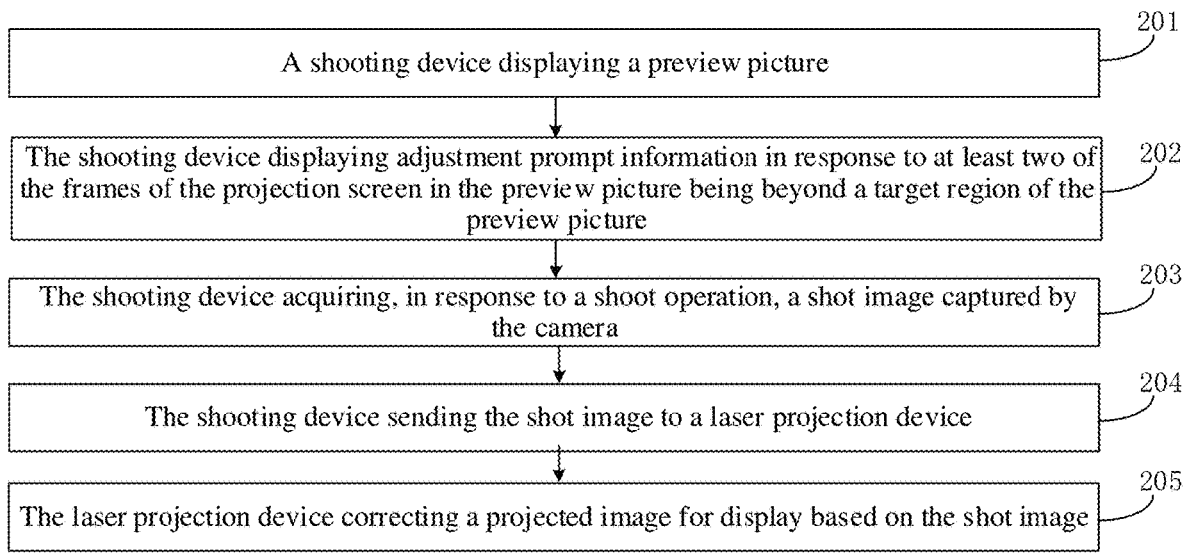
FIG. 2 is a flowchart of a method for correcting an image according to some embodiments of the present disclosure.

FIG. 2 is a flowchart of a method for correcting an image according to some embodiments of the present disclosure. The method is applicable to the system for correcting the image shown in FIG. 1. As shown in FIG. 2, the method includes the following processes.

In S201, the shooting device displays a preview picture.

In the embodiments of the present disclosure, upon projection of a projected image to a projection screen by a laser projection device, a shooting device captures the projection screen by the camera, and displays the preview picture. The preview picture at least includes the frames of the projection screen and the projected image. In some embodiments, the projected image includes a plurality of feature graphical elements arranged in an array, and the feature graphical element is in a cross shape, a quadrilateral shape, and the like.

In some embodiments, the shooting device is provided with a shooting application, and the shooting device displays the preview picture in a shooting interface of the shooting application upon launching of the shooting application.

In S202, the shooting device displays adjustment prompt information in response to at least two of the frames of the projection screen in the preview picture being beyond a target region of the preview picture.

The shooting device detects positions of the frames of the projection screen in the preview picture upon displaying the preview picture. In the case that the positions of the frames of the projection screen are beyond the target region of the preview picture, the shooting device determines that the shot image captured by the camera does not meet requirements, and thus displays the adjustment prompt information.

The adjustment prompt information is configured to instruct to adjust shooting parameters of the camera. In some embodiments, the shooting parameters include a distance between the camera and the projection screen, and/or a focal length of the camera.

In S203, the shooting device acquires, in response to a shoot operation, a shot image captured by the camera.

The shooting device acquires the shot image captured by the camera in response to the shoot operation. In some embodiments, the shooting interface of the shooting device also displays a shooting button, and the shoot operation is a click operation on the shooting button.

In S204, the shooting device sends the shot image to a laser projection device.

The shooting device sends the shot image to the laser projection device upon acquiring the shot image.

In S205, the laser projection device corrects a projected image for display based on the shot image.

The laser projection device corrects a projected image for display based on the shot image upon receiving the shot image from the shooting device.

In summary, the method for correcting the image is provided in the embodiments of the present disclosure. In the method, upon acquiring the shot image acquired by shooting the projection screen by the camera, the shooting device sends the shot image to the laser projection device, such that the laser projection device corrects the projected image for display based on the shot image. Thus, the projected image for display is prevented from running off the projection screen, and the display effect of the projected image is ensured.

In addition, in the case that the frames of the projection screen in the preview picture are beyond the target region of the preview picture, the shooting device determines that the shot image captured by the camera does not meet the requirements, and thus displays the adjustment prompt information. Thus, the shooting parameters of the camera are adjusted in time by the user, such that a size of the projection screen in the shot image captured by the camera meets the requirements, a reliability of the captured shot image is ensured, and a reliability of correction on the projected image for display based on the shot image is further improved.

Figure 3:
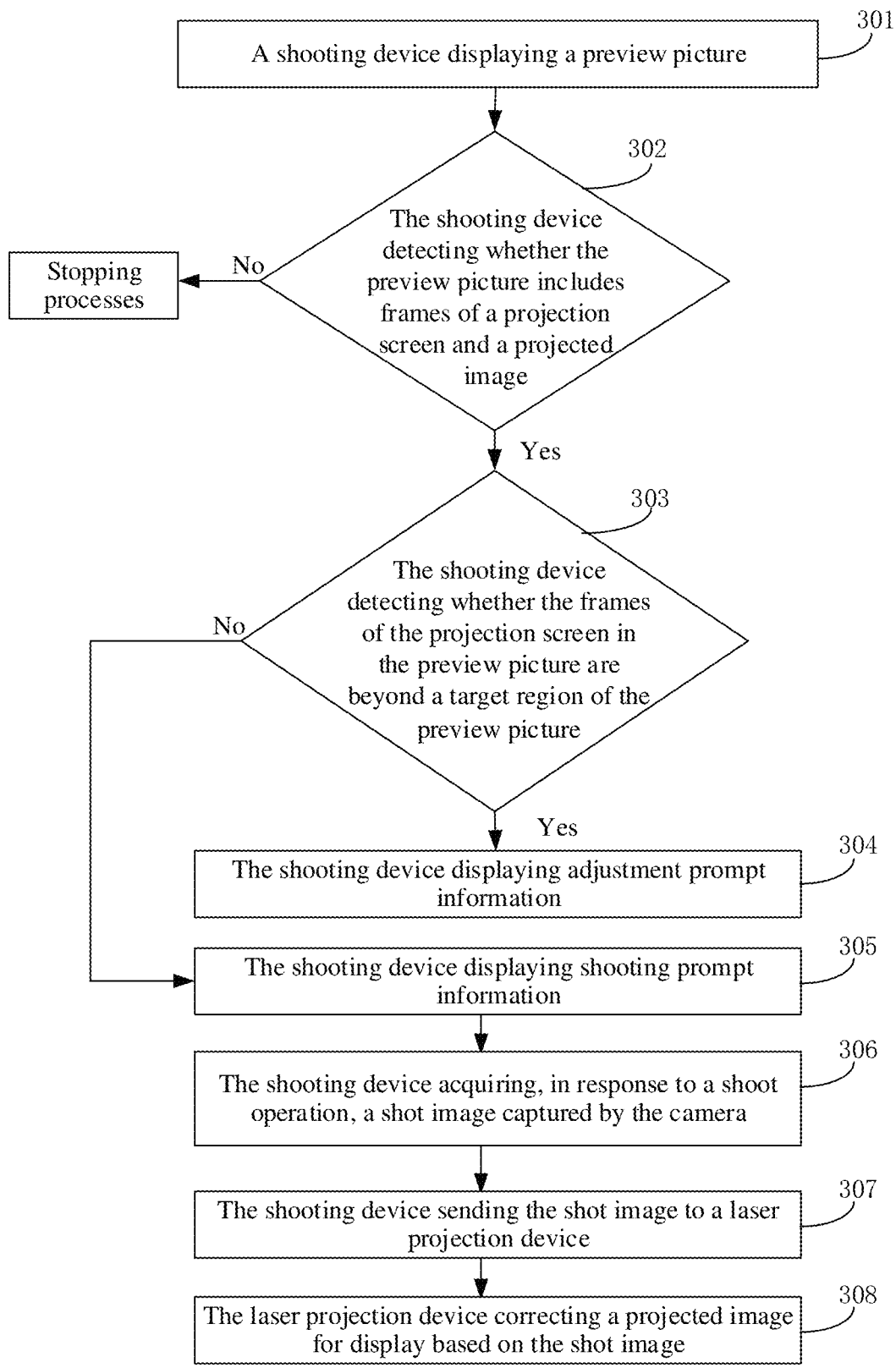
FIG. 3 is a flowchart of another method for correcting an image according to some embodiments of the present disclosure.

FIG. 3 is a flowchart of another method for correcting an image according to some embodiments of the present disclosure. The method is applicable to the system for correcting the image shown in FIG. 1. As shown in FIG. 3, the method includes the following processes.

In S301, the shooting device displays a preview picture.

In the embodiments of the present disclosure, upon projection of a projected image to a projection screen by a laser projection device and display of the projected image thereon, a shooting device captures the projection screen by the camera, and displays the preview picture. In some embodiments, the preview picture at least includes the frames of the projection screen and the projected image. The projected image includes a plurality of feature graphical elements arranged in an array, and the feature graphical element is in a cross shape, a quadrilateral shape, and the like.

Figure 4:
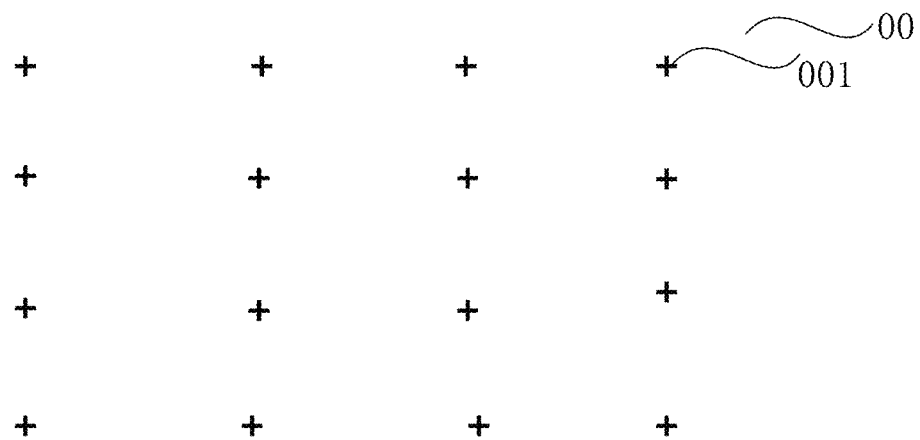
FIG. 4 is a schematic diagram of a projected image according to some embodiments of the present disclosure.

In some embodiments, colors of the plurality of feature graphical elements are the same, and a color of each feature graphical element is different from a background color of the projected image. Referring to FIG. 4, the projected image 00 includes 4*4, that is, 16 feature graphical elements 001, each feature graphical element 001 is in a quadrilateral shape and is black, and the background color of the projected image 00 is white.

Figure 5:
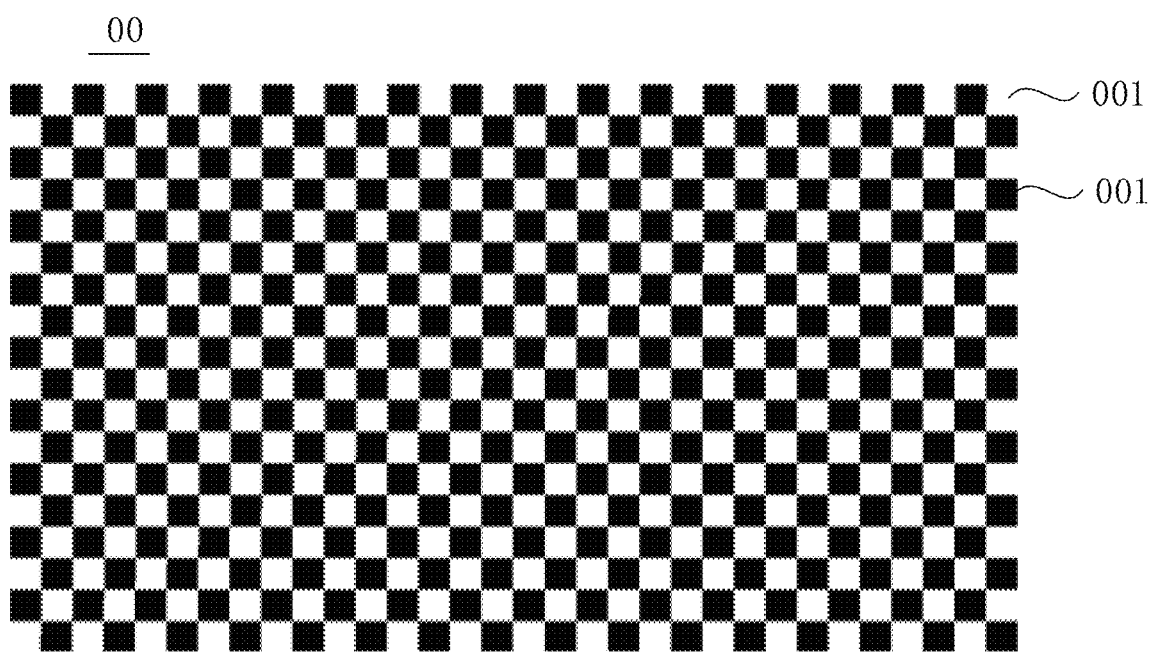
FIG. 5 is a schematic diagram of another projected image according to some embodiments of the present disclosure.

Alternatively, the projected image is a checkerboard image and includes a plurality of black feature graphical elements and a plurality of white feature graphical elements that are arranged in an array, and each black feature graphical element is adjacent to a white feature graphical element. Referring to FIG. 5, the projected image 00 includes 18*32, that is, 576 feature graphical elements 001, the 576 feature graphical elements 001 include a plurality of black feature graphical elements and a plurality of white feature graphical elements, and each black feature graphical element is adjacent to one white feature graphical element.

In some embodiments, the shooting device is provided with a shooting application, and the shooting device displays the preview picture in a shooting interface of the shooting application upon launching of the shooting application.

In S302, the shooting device detects whether the preview picture includes the frames of the projection screen and the projected image.

The shooting device detects whether the preview picture includes the frames of the projection screen and the projected image upon displaying the preview picture. In the case that the preview picture includes the frames of the projection screen and the projected image, S303 is performed. In the case that the preview picture does not include the frames of the projection screen and the projected image, the process is stopped.

In the embodiments of the present disclosure, the projection screen at least includes a projection region and frames surrounding the projection region. The feature graphical element in the projected image is within the frames. The frames form a closed polygon, for example, a rectangle. In addition, the color of the frame is different from a color of the projection region.

In some embodiments, the shooting device detects whether the preview picture includes the frames of the projection screen and the projected image using a target detecting algorithm upon displaying the preview picture. For example, a template of the frames of the projection screen and a template of the feature graphical element are pre-stored in the shooting device, and the target detecting algorithm is a detecting algorithm matched base on the templates. It should be noted that in the case that the shooting device determines that the preview picture includes the frames of the projection screen, a complete frames are identified from the preview picture.

In S303, the shooting device detects whether the frames of the projection screen in the preview picture are beyond a target region of the preview picture.

The shooting device determines positions of the frames of the projection screen in the preview picture upon detection of the frames of the projection screen and the projected image in the preview picture. In the case that the positions of the frames of the projection screen are beyond the target region of the preview picture, the shooting device determines that the shot image captured by the camera does not meet requirements, and thus S304 is performed. In the case that the positions of the frames of the projection screen are within the target region of the preview picture, the shooting device determines that the shot image captured by the camera meets the requirements, and thus S305 is performed.

The positions of the frames of the projection screen being within the target region means that edges of the frames are all within the target region. The target region is a fixed region in the preview picture, and a size of the projection screen in the preview picture is appropriate in the case that the frames of the projection screen are within the target region, such that the laser projection device is facilitated identifying the position of the feature graphical element in the projected image, and the projection position of the projected image for display is corrected based on the position of the feature graphical element.

In some embodiments, the target region is an annular region, for example, a rectangular annular region. A proportion range is pre-stored in the shooting device. An upper limit of the proportion range is a proportion of an area of an outer annulus of the target region in an area of the preview picture, and a lower limit of the proportion range is a proportion of an area of an inner annulus of the target region in the area of the preview picture.

The shooting device calculates a proportion of an area of the projection screen in the preview picture in the area of the preview picture upon identification of the frames of the projection screen and the projected image in the preview picture. In the case that the proportion is beyond the proportion range, the shooting device determines that the frames of the projection screen are beyond the target region of the preview picture. In the case that the proportion is within the proportion range, the shooting device determines that the frames of the projection screen are within the target region of the preview picture. The area of the projection screen is an area of a region enclosed by all edges of the frames of the projection screen.

Illustratively, assuming that the lower limit of the proportion range is 60%, and the upper limit of the proportion range is 1, then in the case that the shooting device detects that the proportion of the area of the projection screen in the preview picture in the area of the preview picture is 50%, 50% is less than 60%, and thus the shooting device determines that the frames of the projection screen are beyond the target region of the preview picture. Thus, S304 may be performed.

In S304, the shooting device displays adjustment prompt information.

In response to identifying the frames of the projection screen and the projected image in the preview picture and detecting that the frames of the projection screen is beyond the target region of the preview picture, the shooting device displays the adjustment prompt information. The adjustment prompt information is configured to instruct to adjust shooting parameters of the camera. In some embodiments, the shooting parameters include a distance between the camera and the projection screen, and/or a focal length of the camera.

The adjustment prompt information is further configured to indicate that the frames of the projection screen are beyond the target region of the preview picture.

In some embodiments, the adjustment prompt information is further configured to indicate that the proportion is not within the proportion range. Illustratively, in the case that the proportion is 50%, and the lower limit of the proportion range is 60%, the adjustment prompt information indicates that a proportion of the current projection screen in the preview picture is less than 60%.

In the embodiments of the present disclosure, the shooting device further displays a shooting prompt box at a target position in the preview picture. The adjustment prompt information is further configured to instruct to move the frames of the projection screen to the target region limited by the shooting prompt box. The shooting prompt box may be a rectangular box.

The target position is a position of a center point of the preview picture, and a center point of the shooting prompt box is coincided with the center point of the preview picture.

The target region is a region in the preview picture other than a region limited by the shooting prompt box. Alternatively, the shooting prompt box includes a first prompt box and a second prompt box surrounding the first prompt box, and the target region is a region between the first prompt box and the second prompt box. The adjustment prompt information is further configured to instruct to move the frames of the projection screen to a position between the first prompt box and the second prompt box. In some embodiments, the first prompt box and the second prompt box are polygons. For example, both the first prompt box and the second prompt box are quadrilaterals. Alternatively, both the first prompt box and the second prompt box are non-closed graphical elements, and the non-closed graphical element includes a plurality of spaced-apart boundary lines.

Figure 6:
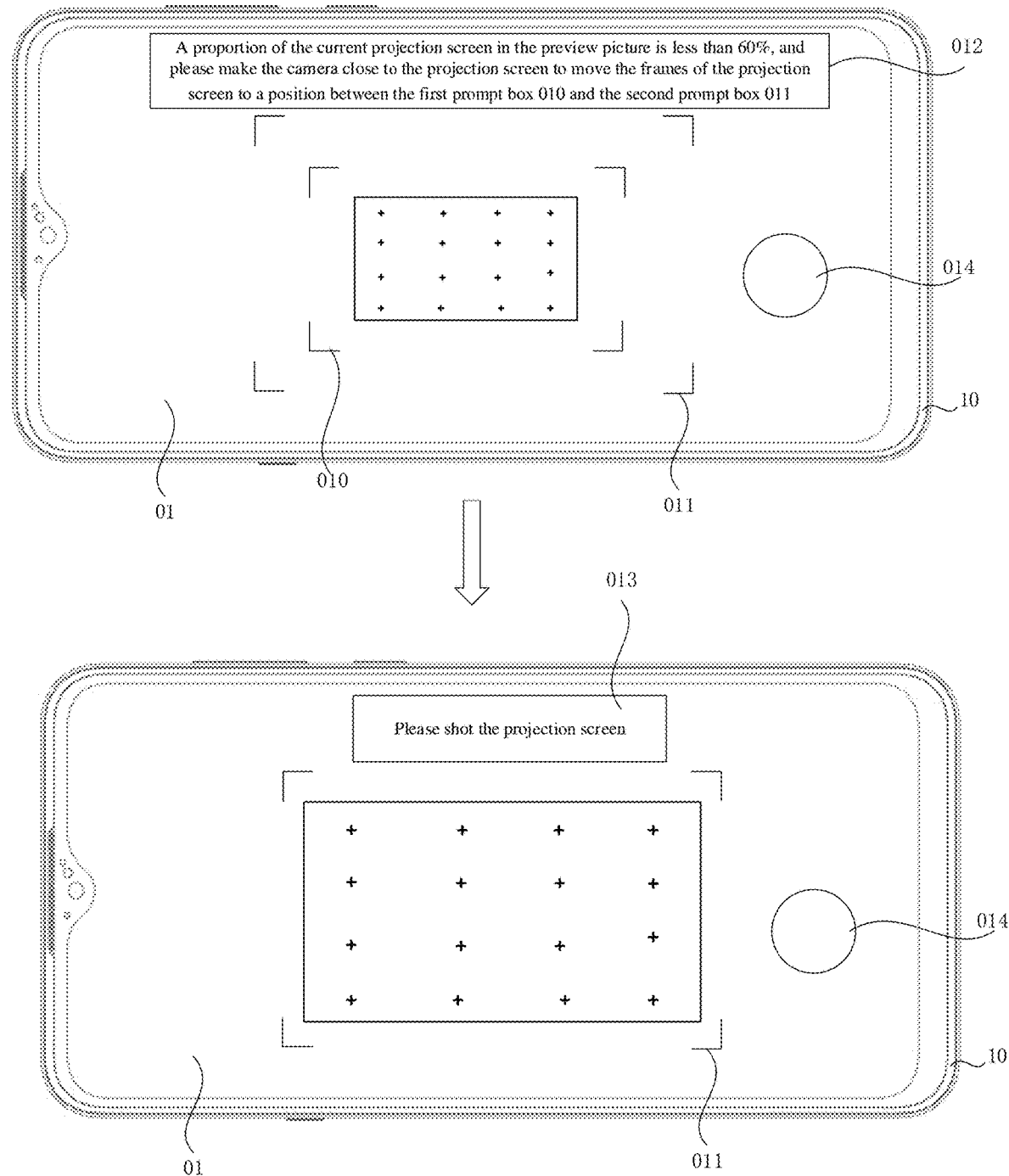
FIG. 6 is a schematic diagram of a first prompt box and a second prompt box according to some embodiments of the present disclosure.

Illustratively, referring to FIG. 6, both the first prompt box 010 and the second prompt box 011 surrounding the first prompt box 010 in the preview picture 01 are rectangular dashed boxes, and the adjustment prompt information 012 indicates that: a proportion of the current projection screen in the preview picture is less than 60%, and please make the camera close to the projection screen to move the frames of the projection screen to a position between the first prompt box 010 and the second prompt box 011.

Figure 7:
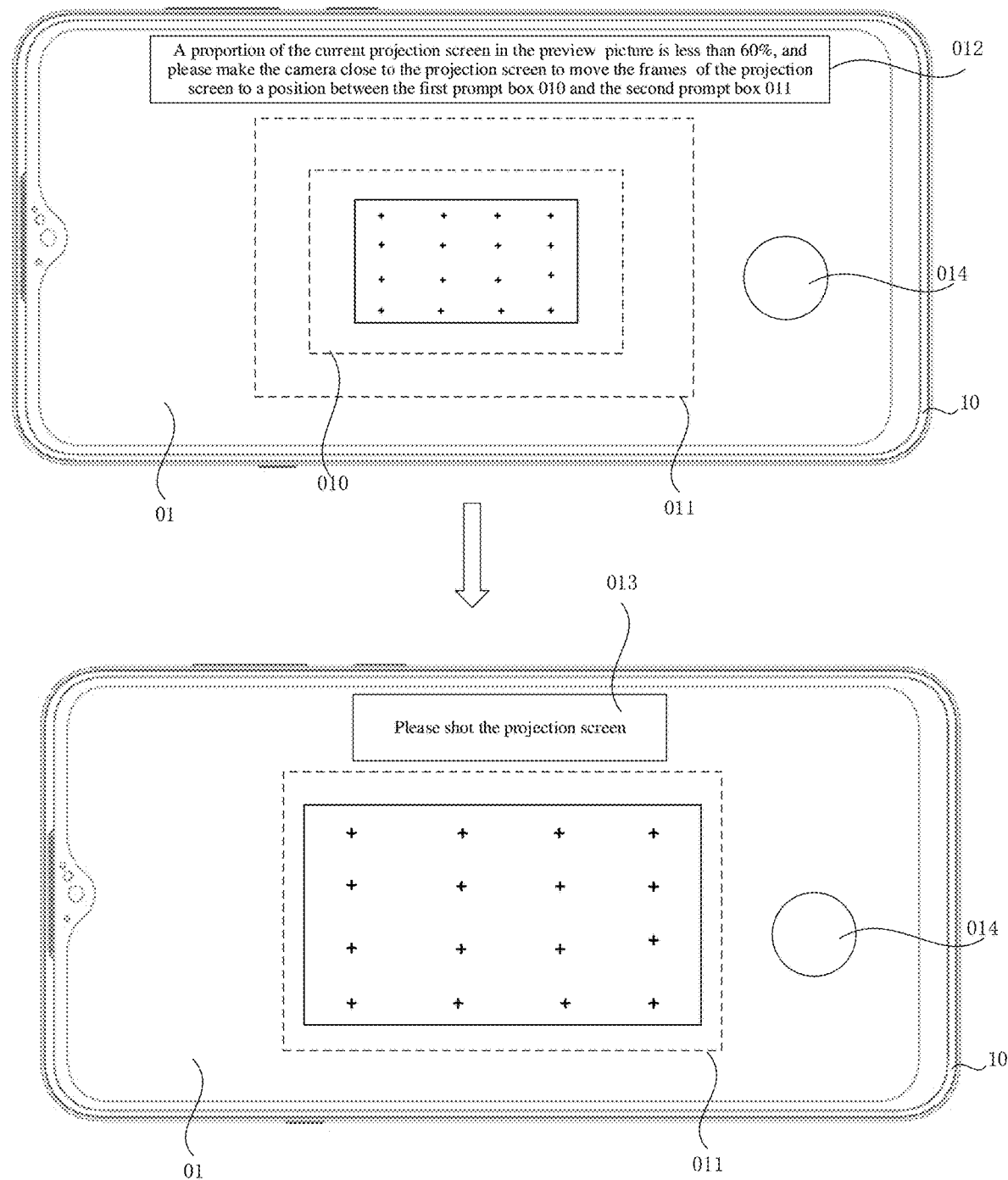
FIG. 7 is a schematic diagram of another first prompt box and another second prompt box according to some embodiments of the present disclosure.

Illustratively, referring to FIG. 7, both the first prompt box 010 and the second prompt box 011 surrounding the first prompt box 010 in the preview picture 01 include four spaced-apart boundaries, the four spaced-apart boundaries enclose a rectangle and are in four vertex angles of the rectangle. The adjustment prompt information 012 indicates that: a proportion of the current projection screen in the preview picture is less than 60%, and please make the camera close to the projection screen to move the frames of the projection screen to a position between the first prompt box 010 and the second prompt box 011.

Figure 8:
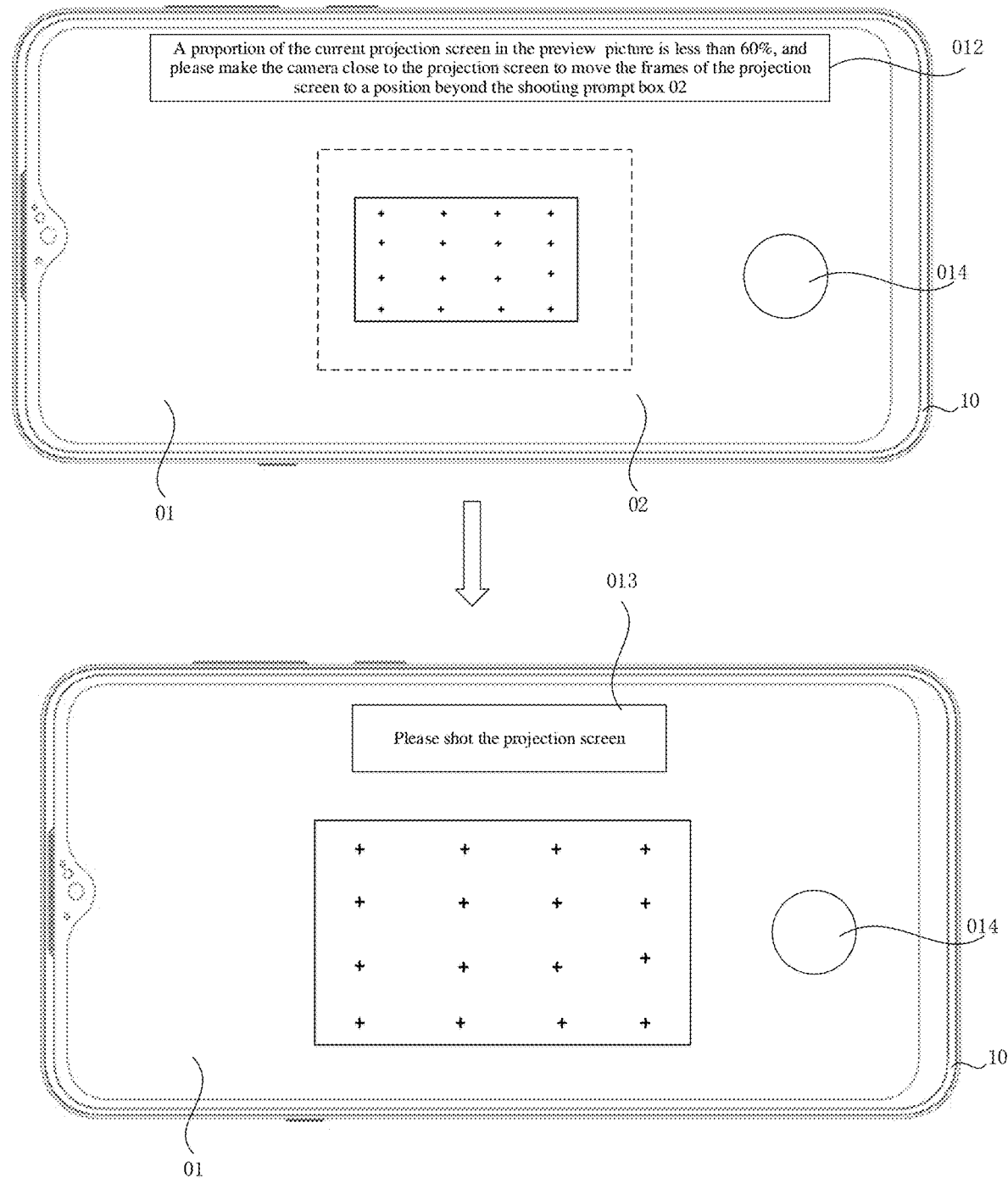
FIG. 8 is a schematic diagram of a shooting prompt box according to some embodiments of the present disclosure.

Illustratively, referring to FIG. 8, the shooting prompt box 02 in the preview picture 01 is a rectangular dashed box, and the adjustment prompt information 012 indicates that: a proportion of the current projection screen in the preview picture is less than 60%, and please make the camera close to the projection screen to move the frames of the projection screen to a position beyond the shooting prompt box 02.

Figure 9:
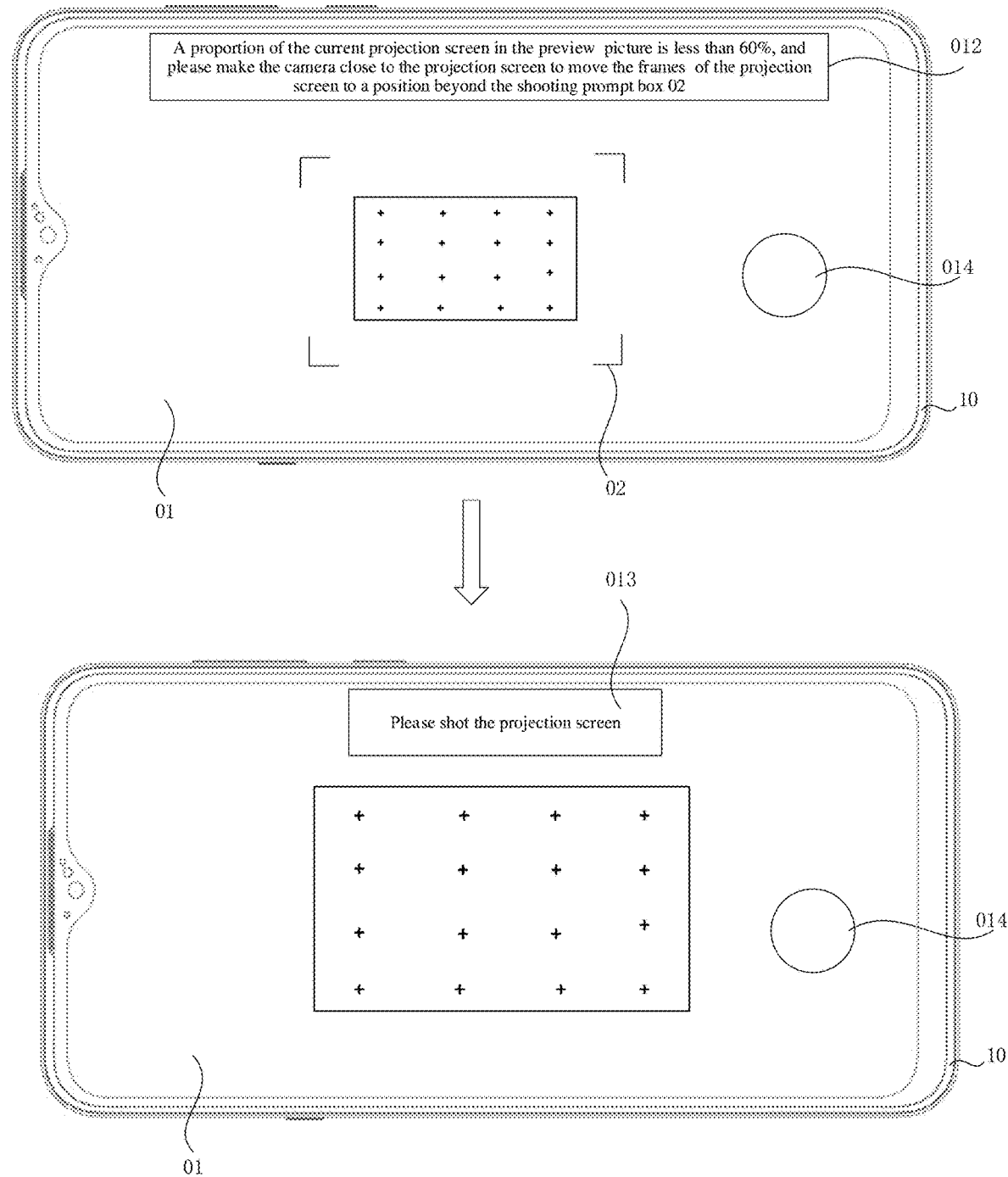
FIG. 9 is a schematic diagram of another shooting prompt box according to some embodiments of the present disclosure.

Illustratively, referring to FIG. 9, the shooting prompt box 02 in the preview picture 01 includes four spaced-apart boundaries, the four spaced-apart boundaries enclose a rectangle, and the four spaced-apart boundaries are in four vertex angles of the rectangle. The adjustment prompt information 012 indicates that: a proportion of the current projection screen in the preview picture is less than 60%, and please make the camera close to the projection screen to move the frames of the projection screen to a position beyond the shooting prompt box 02.

In the embodiments of the present disclosure, in shooting the projection screen using the shooting device, in the case that the projection screen in the preview picture is within the first prompt box, the size of the projection screen in the preview picture is less, and a distance between the camera in the shooting device and the projection screen is less. Thus, the size of the projection screen in the preview picture is increased by shortening the distance between the shooting device and the projection screen by the user. In addition, by displaying the first prompt box and the second prompt box in the preview picture, the user can accurately determine the positions and sizes of the frames of the projection screen, and further accurately determine whether the preview picture meets the requirements, such that the reliability of the shot image is ensured. In addition, by displaying the first prompt box and the second prompt box, the user may quickly determine how to adjust the size of the projection screen in the preview picture to improve an efficiency of capturing the shot image.

In some embodiments of the present disclosure, the shooting device displays two parallel shooting reference lines in the preview picture. The adjustment prompt information is further configured to instruct to move the frames of the projection screen to a target region defined by the two shooting reference lines.

The two shooting reference lines are symmetrically disposed on two sides of the preview picture. For example, in the case that the preview picture is a rectangular picture, the two shooting reference lines are symmetrically disposed on two sides of a central axis of the preview picture. The central axis is parallel to long edges of the preview picture or short edges of the preview picture.

The target region includes a first sub-region and a second sub-region. The first sub-region is a region, with a distance to one of the two shooting reference lines being less than a distance threshold, in the preview picture, and the second sub-region is a region, with a distance to the other of the two shooting reference lines being less than the distance threshold, in the preview picture. The distance threshold is a distance value pre-stored in the shooting device. Accordingly, the frames of the projection screen being in the target region means that two opposite edges of the frames of the projection screen are within the sub-region.

In some embodiments, lengths of the two shooting reference lines are equal, and a distance between the two shooting reference lines is greater than the length of any shooting reference line. That is, the two shooting reference lines may be parallel to the short edges of the preview picture.

Figure 10:
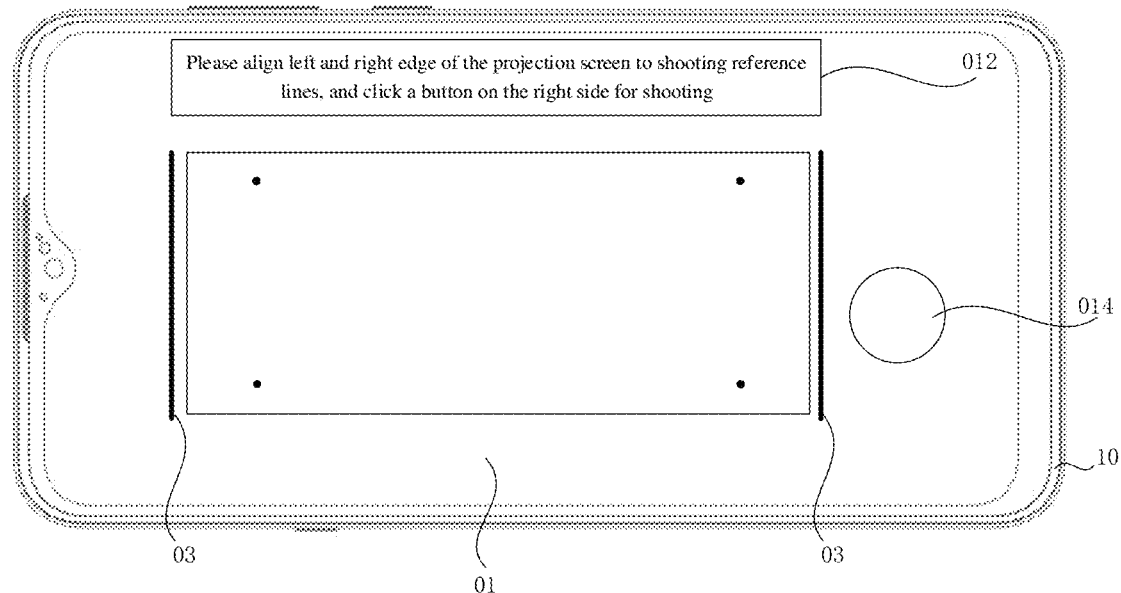
FIG. 10 is a schematic diagram of shooting reference lines according to some embodiments of the present disclosure.
Figure 11:
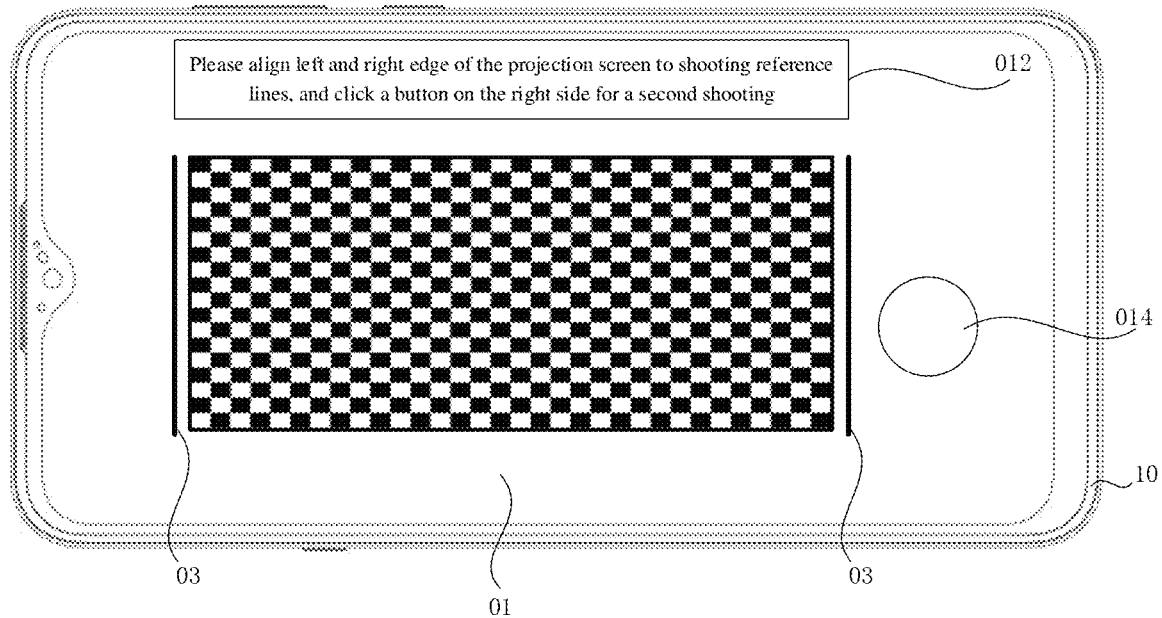
FIG. 11 is a schematic diagram of another shooting reference lines according to some embodiments of the present disclosure.

Illustratively, referring to FIG. 10 and FIG. 11, the shooting device 10 displays two parallel shooting reference lines 03 in the preview picture 01, and the two shooting reference lines 03 are parallel to the short edges of the preview picture 01. The adjustment prompt information 012 is "please align left and right edge of the projection screen to shooting reference lines, and click a button on the right side for shooting." Alternatively, the adjustment prompt information 012 is "please align left and right edge of the projection screen to shooting reference lines, and click a button on the right side for a second shooting."

The two shooting reference lines are displayed in the preview picture, such that the user interface is more user-friendly, and a pressure for shooting prompt on the user is less. In addition, the two shooting reference lines may be connected to form an enclosed shape with the same shape of the projection screen, for example, an enclosed rectangle. In addition, a ratio of a long side to a short side of the rectangle may be equal to a ratio of a long side to a short side of the projection screen. Illustratively, in the case that the projection screen is a rectangle with the ratio of the long side to the short side being 16:9, the two shooting reference lines are designed with the ratio of 16:9. On this basis, a complete projected image (including the frames and displayed picture) is captured in the case that the picture shot by the user is within the target region defined by the two shooting reference lines.

In S305, the shooting device displays the shooting prompt information.

In the embodiments of the present disclosure, in the case that the shooting device identifies the frames of the projection screen and the projected image from the preview picture, and the frames of the projection screen in the preview picture are within the target region, the shooting device determines that the shot image acquired by shooting the projection screen currently meets the requirements, and thus the shooting prompt information is displayed. The shooting prompt information is configured to instruct to shoot the projection screen. Illustratively, referring to FIG. 6, FIG. 7, FIG. 8, and FIG. 9, the shooting prompt information 013 is: "please shoot the projection screen."

In S306, the shooting device acquires, in response to a shoot operation, a shot image captured by the camera.

Upon displaying the shooting prompt information and receiving the shoot operation performed by the user based on the shooting prompt information, the shooting device acquires the shot image captured by the camera in response to the shoot operation. In some embodiments, referring to FIG. 6, FIG. 7, FIG. 8, FIG. 9, FIG. 10, and FIG. 11, the shooting interface of the shooting device also displays a shooting button 014, and the shoot operation is a click operation on the shooting button 014. In some embodiments, the shoot operation is an operation of other types, for example, an audio operation, a press operation for a physical button of the shooting device, and the like.

In S307, the shooting device sends the shot image to a laser projection device.

The shooting device sends the shot image to the laser projection device upon acquiring the shot image.

It should be understood that the above target region defined by the shooting prompt box or the shooting reference lines are ideal range designed by software, and instructs the user to shot a complete and clear picture. In the case that frames of the picture shot by the user partially run off the shooting reference line on one side or within the shooting prompt box, and is within the shooting range of the camera, the image can be used actually upon processing of the software. That is, the shooting device acquires the shot image, and sends the shot image to the laser projection device.

In S308, the laser projection device corrects a projected image for display based on the shot image.

It should be understood that the laser projection device corrects a projection position of a projected image for display on the projection screen based on the shot image upon receiving the shot image from the shooting device. It should be noted that the projected image is an image for determining a correction position, and thus is also referred to as the corrected image. The projected image for display is an image for displaying video content.

In some embodiments of the present disclosure, in the case that a flatness of the projection screen is great, colors of the plurality of feature graphical elements in the projected image (that is, the corrected image) pre-stored in the laser projection device are the same, and colors of the feature graphical elements and the background color the projected image are different. In the case that the image projected to the projection screen by the laser projection device is beyond the projection screen, the laser projection device projects the projected image to the projection screen in correcting the image.

For example, the projected image is the projected image 00 in FIG. 4. Accordingly, correction parameters include correction positions of a plurality of vertexes in the projected image for display in a coordinate system of the first image. In the case that the projected image for display is in a quadrilateral shape, the vertexes of the projected image for display include an upper left vertex, a lower left vertex, an upper right vertex, and a lower right vertex.

The following describes a process of determining the correction position of the target vertex in the projected image for display in a coordinate system of the first image by the laser projection device. The target vertex is any vertex in the projected image for display.

First, upon receiving the shot image sent by the shooting device, the laser projection device determines a target projection position of a target feature graphical element in the projection screen based on perspective transformation coefficients of the camera in the shooting device and a position of the target feature graphical element in the shot image. The target feature graphical element is a feature graphical element, closest to a projection position of the target vertex, in the plurality of feature graphical elements. For example, assuming that the target vertex of the projected image for display is the upper right vertex, the target feature graphical element is a feature graphical element at an upper right corner of the feature graphical element.

Illustratively, referring to FIG. 4, the target feature graphical element is the feature graphical element 001 at the upper right corner of the projected image 00.

Then, the laser projection device determines an actual relative position of a position of a target vertex of the frame of the projection screen and the target projection position, and an initial relative position of the position of the target vertex of the frame and an initial projection position of the target feature graphical element. Furthermore, the laser projection device determines a target offset based on the actual relative position and the initial relative position. The target offset is an offset of the target vertex of the projected image on the target projection position of the projection screen relative to the initial projection position. The target vertex of the frame is a vertex in the same orientation as the target vertex of the projected image for display in the plurality of vertexes of the frames. The target vertex of the projected image is a vertex in the same orientation as the target vertex of the projected image for display in the plurality of vertexes of the projected image. Illustratively, in the case that the target vertex of the projected image for display is an upper right vertex in a second target image, the target vertex of the frame is an upper right vertex of the frame, and the target vertex of the projected image is an upper right vertex of the projected image.

It should be noted that the target offset is a vector including an offset direction and a value of the offset.

Furthermore, the laser projection device determines a pixel offset of a target vertex of the second projected image in the coordinate system of the first image based on the target offset and a pre-stored corresponding relationship, such that a correction position of a target vertex of the projected image for display in the coordinate system of the first image is determined based on the pixel offset and the initial position of the target vertex of the projected image for display in the coordinate system of the first image.

The pixel offset is a vector including an offset direction and a value of the offset. The perspective transformation coefficient transforms a position of any point in the projection screen to a position in the shot image, that is, the perspective transformation coefficient is a transformation coefficient between a screen coordinate system of the projection screen and a coordinate system of a second image of the shot image. The perspective transformation coefficient is correlated with a shooting position of the camera, a distance between the camera and the projection screen, and a resolution of the camera. The corresponding relationship is a corresponding relationship between an offset in the coordinate system of the screen and an offset in the coordinate system of the first image. The initial projection position of the target feature graphical element is a projection position of the target feature graphical element in the projection screen in the case that the projected image is within the projection screen.

Based on the above method, the laser projection device determines the correction positions of the vertexes of the projected image for display in the coordinate system of the first image, and the correction positions of the vertexes of the projected image for display are sent to the laser projection device. The laser projection device corrects the projected image for display based on the correction positions of the vertexes of the projected image for display in the coordinate system of the first image, such that the corrected projected image for display is acquired.

In some embodiments, for each vertex of the projected image for display, the laser projection device moves the vertex and pixel points between the initial position and the correction position of the vertex to the correction position of the vertex, such that the projected image for display is corrected.

In some embodiments of the present disclosure, the target projection position and the initial projection position of the target feature graphical element and the positions of the plurality of vertexes of the projection screen are positions in the coordinate system of the projection screen. The correction position and the initial position of the vertex of the projected image for display are positions in coordinate system of the first image in the projected image for display. The position of each feature graphical element in the shot image is the position in the coordinate system of the second image in the shot image.

An origin point of the coordinate system of the screen is a center point of the projection screen, a horizontal axis of the coordinate system of the screen is parallel to a pixel row direction of the projection screen, and a vertical axis of coordinate system of the screen is parallel to a pixel column direction of the projection screen. An origin point of the coordinate system of the first image is a center point of the projected image for display, a horizontal axis of the coordinate system of the first image is parallel to a pixel row direction of the projected image for display, and a vertical axis of coordinate system of the first image is parallel to a pixel column direction of the projected image for display. An origin point of the coordinate system of the second image is a center point of the shot image, a horizontal axis of the coordinate system of the second image is parallel to a pixel row direction of the shot image, and a vertical axis of coordinate system of the second image is parallel to a pixel column direction of the shot image.

In some embodiments, the target projection position of the target feature graphical element includes an abscissa and an ordinate, and the initial projection position of the target feature graphical element includes an abscissa and an ordinate. The position of the target vertex of the frame of the projection screen includes an abscissa and an ordinate. The actual relative position includes a first absolute value and a second absolute value. The first absolute value is an absolute value of a first difference, and the first difference is a difference between a value of the abscissa of the position of the target vertex of the frame and a value of the abscissa of the target projection position. The second absolute value is an absolute value of a second difference, and the second difference is a difference between a value of the ordinate of the position of the target vertex of the frame and a value of the ordinate of the target projection position.

The initial relative position includes a third absolute value and a fourth absolute value. The third absolute value is an absolute value of a third difference, and the third difference is a difference between a value of the abscissa of the position of the target vertex of the frame and a value of the abscissa of the initial projection position. The fourth absolute value is an absolute value of a fourth difference, and the second difference is a difference between a value of the ordinate of the position of the target vertex of the frame and a value of the ordinate of the initial projection position.

The above value of the target offset includes a first target offset and a second target offset. The first target offset is an absolute value of a difference between the third absolute value and the first absolute value, and the second target offset is an absolute value of a difference between the fourth absolute value and the second absolute value. The offset direction of the target offset includes a first direction and a second direction. The first direction is a direction parallel to the pixel row direction and away from the center point of the coordinate system of the screen. The second direction is a direction parallel to the pixel column direction and away from the center point of the coordinate system of the screen. The value of the pixel offset includes a first pixel offset and a second pixel offset.

The following is illustrated by taking the target vertex of the frame of the projection screen being the upper right vertex as an example. In the case that the third absolute value is less than the first absolute value, the laser projection device determines that the target projection position of the upper right vertex of the first projected image is offset by a first target offset in the first direction relative to the initial projection position. In the case that the abscissa of the initial position of the upper right vertex of the second projected image in the coordinate system of the first image is greater than 0, the laser projection device determines that the abscissa of the correction position of the upper right vertex of the second projected image is a difference between the abscissa of the initial position of the upper right vertex of the second projected image in the coordinate system of the first image and the first pixel offset. In the case that the abscissa of the initial position of the upper right vertex of the second projected image in the coordinate system of the first image is less than 0, the laser projection device determines that the abscissa of the correction position of the upper right vertex of the second projected image is a sum of the abscissa of the initial position of the upper right vertex of the second projected image in the coordinate system of the first image and the first pixel offset.

In the case that the third absolute value is greater than the first absolute value, the laser projection device determines that the target projection position of the upper right vertex of the first projected image is offset by a first target offset value in a direction opposite to the first direction relative to the initial projection position. In the case that the abscissa of the initial position of the upper right vertex of the second projected image in the coordinate system of the first image is greater than 0, the laser projection device determines that the abscissa of the correction position of the upper right vertex of the second projected image is a sum of the abscissa of the initial position of the upper right vertex of the second projected image in the coordinate system of the first image and the first pixel offset. In the case that the abscissa of the initial position of the upper right vertex of the second projected image in the coordinate system of the first image is less than 0, the laser projection device determines that the abscissa of the correction position of the upper right vertex of the second projected image is a difference between the abscissa of the initial position of the upper right vertex of the second projected image in the coordinate system of the first image and the first pixel offset.

In the case that the fourth absolute value is less than the second absolute value, the laser projection device determines that the target projection position of the upper right vertex of the first projected image is offset by a second target offset value in the second direction relative to the initial projection position. The laser projection device determines the correction position of the upper right vertex based on the above method.

In the case that the fourth absolute value is less than the second absolute value, the laser projection device determines that the target projection position of the upper right vertex of the first projected image is offset by a direction opposite to the second target offset in the second direction relative to the initial projection position. The laser projection device determines the correction position of the upper right vertex based on the above method.

The correction positions of the upper left vertex, the lower left vertex, the upper right vertex, and the lower right vertex of the projected image for display in the coordinate system of the first image are determined by the laser projection device based on the above method.

Illustratively, assuming that the initial position of the upper right vertex of the projected image for display is greater than the correction position, the laser projection device adjusts the upper right vertex of the projected image for display and pixel points between the initial position of the upper right vertex and the correction position to the correction position, such that the projected image for display is corrected. That is, the projected image for display is shrunk, such that the projected image for display is displayed within the frames of the projection screen.

In some embodiments of the present disclosure, in the case that a flatness of the projection screen is poor, the projected image (that is, the corrected image) pre-stored in the laser projection device is a checkerboard image. In the case that the image projected to the projection screen by the laser projection device is deformed, and/or beyond the projection screen, the laser projection device projects the projected image to the projection screen in correcting the image.

For example, the projected image is the projected image 00 in FIG. 5. The plurality of feature graphical elements in the projected image are in one-to-one correspondence to the plurality of pixel regions in the projected image for display. The plurality of pixel regions include a plurality of pixels arranged in an array. Correspondingly, correction parameters include correction positions of the plurality of pixel regions in the projected image for displaying in the coordinate system of the first image.

The feature graphical element in $i^{th}$ row and $j^{th}$ column in the projected image corresponds to the pixel region in $i^{th}$ row and $j^{th}$ column in the projected image for display, and the feature graphical element is configured to determine the correction position of the corresponding pixel region. i is a positive integer less than or equal to a number of rows of the feature graphical elements in the projected image, and j is a positive integer less than or equal to a number of columns of the feature graphical elements in the projected image.

Upon receiving the shot image sent by the shooting device, the laser projection device determines the target projection position of the feature graphical element in the projection screen for each feature graphical element, and determines the actual offset of the feature graphical element based on the target projection position and the initial projection position. Then, the laser projection device determines the pixel offset of the pixel region corresponding to the feature graphical element in the projected image for display in the coordinate system of the first image based on the actual offset of the feature graphical element, and determines the correction position of the pixel region based on the pixel offset of the pixel region. It should be understood that the pixel offset is a vector including an offset direction and a value of the offset.

Based on the above method, the laser projection device determines the correction positions of the pixel regions of the projected image for display. Then the laser projection device corrects the pixels in each pixel region in the projected image for display from the initial position of the pixel region in the coordinate system of the first image to the correction position of the pixel region in the coordinate system of the first image, such that the corrected projected image for display is acquired, the projected image for display is corrected, the projected image displayed on a deformed projection screen is not deformed, and/or the projected image is not beyond the projection screen, and the display effect of the projected image is great.

It should be noted that, the order of the processes of the method for correcting the image in the embodiments of the present disclosure may be appropriately adjusted, and processes may also be removed. For example, S304 may be removed as requirements. Any variations to the methods readily derived by persons skilled in the art within the technical scope disclosed in the present disclosure shall fall within the scope of protection of the present disclosure. Therefore, details are not described herein again.

In summary, the method for correcting the image is provided in the embodiments of the present disclosure. In the method, upon acquiring the shot image acquired by shooting the projection screen by the camera, the shooting device sends the shot image to the laser projection device, such that the laser projection device corrects the projected image for display based on the shot image. Thus, the projected image for display is prevented from running off the projection screen, and the display effect of the projected image is ensured.

In addition, in the case that the frames of the projection screen in the preview picture are beyond the target region of the preview picture, the shooting device determines that the shot image captured by the camera does not meet the requirements, and thus displays the adjustment prompt information. Thus, the shooting parameters of the camera are adjusted in time by the user, such that a size of the projection screen in the shot image captured by the camera meets the requirements, a reliability of the captured shot image is ensured, and a reliability of correction on the projected image for display based on the shot image is further improved.

The embodiments of the present disclosure further provide a system for correcting an image of a laser projection device. As shown in FIG. 1, the system for correcting the image includes a shooting device 10 and a laser projection device 20. The shooting device 10 and the laser projection device 20 are configured to perform the method for correcting the image in the above embodiments.

Figure 12:
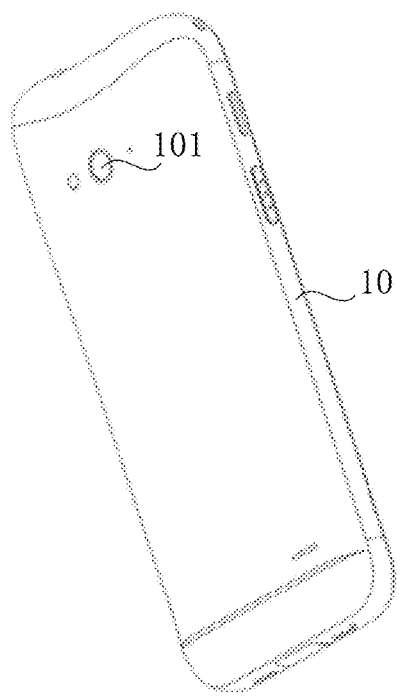
FIG. 12 is a schematic structural diagram of a shooting device according to some embodiments of the present disclosure.

FIG. 12 is a schematic structural diagram of a shooting device according to some embodiments of the present disclosure. As shown in FIG. 12, the shooting device 10 includes a camera 101, and is configured to:

display a preview picture, wherein the preview picture includes a projection screen, and a projected image is displayed in the projection screen;

display adjustment prompt information in response to the frames of the projection screen in the preview picture being beyond a target region of the preview picture, wherein the adjustment prompt information is configured to instruct to adjust shooting parameters of the camera;

acquire, in response to a shoot operation, a shot image captured by the camera; and send the shot image to a laser projection device, wherein the shot image is configured to correct a projected image for display based on the shot image by the laser projection device.

In summary, the shooting device is provided in the embodiments of the present disclosure. In the shooting device, upon acquisition of the shot image captured by shooting the projection screen by the camera, the shot image is sent to the laser projection device, such that the laser projection device corrects the projected image for display based on the shot image. Thus, the projected image for display is prevented from running off the projection screen, and the display effect of the projected image is ensured.

In addition, in the case that the shooting device detects that the frames of the projection screen in the preview picture is beyond the target region of the preview picture, the shooting device determines that the shot image captured by the camera does not meet the requirements, and thus displays the adjustment prompt information. Thus, the shooting parameters of the camera are adjusted in time by the user, such that a size of the projection screen in the shot image captured by the camera meets the requirements, a reliability of the captured shot image is ensured, and a reliability of correction on the projected image for display based on the shot image is further improved.

In some embodiments, the adjustment prompt information is further configured to indicate that the frames of the projection screen are beyond the target region of the preview picture.

In some embodiments, the shooting device 10 is further configured to:

detect positions of the frames of the projection screen in the preview picture in response to the preview picture including the frames of the projection screen and the projected image.

In some embodiments, the shooting device 10 is further configured to:

prior to acquiring, in response to the shoot operation, the shot image captured by the camera, display shooting prompt information in response to the frames of the projection screen being within the target region, wherein the shooting prompt information is configured to instruct to shoot the projection screen.

In some embodiments, the shooting device 10 is further configured to:

display a shooting prompt box at a target position in the preview picture, wherein the adjustment prompt information further is configured to instruct to move the frames of the projection screen to the target region limited by the shooting prompt box.

In some embodiments, the target region is a region in the preview picture other than a region limited by the shooting prompt box; or the shooting prompt box includes a first prompt box and a second prompt box surrounding the first prompt box, and the target region is a region between the first prompt box and the second prompt box.

In some embodiments, the shooting device 10 is further configured to: display two parallel shooting reference lines in the preview picture, wherein the adjustment prompt information is further configured to instruct to move the frames of the projection screen to a target region defined by the two shooting reference lines.

Lengths of the two shooting reference lines are equal, and a distance between the two shooting reference lines is greater than the lengths.

In summary, the shooting device is provided in the embodiments of the present disclosure. In the shooting device, upon acquisition of the shot image acquired by shooting the projection screen by the camera, the shot image is sent to the laser projection device, such that the laser projection device corrects the projected image for display based on the shot image. Thus, the projected image for display is prevented from running off the projection screen, and the display effect of the projected image is ensured.

In addition, in the case that the shooting device detects that the frames of the projection screen in the preview picture are beyond the target region of the preview picture, the shooting device determines that the shot image captured by the camera does not meet the requirements, and thus displays the adjustment prompt information. Thus, the shooting parameters of the camera are adjusted in time by the user, such that a size of the projection screen in the shot image captured by the camera meets the requirements, a reliability of the captured shot image is ensured, and a reliability of correction on the projected image for display based on the shot image is further improved.

Figure 13:
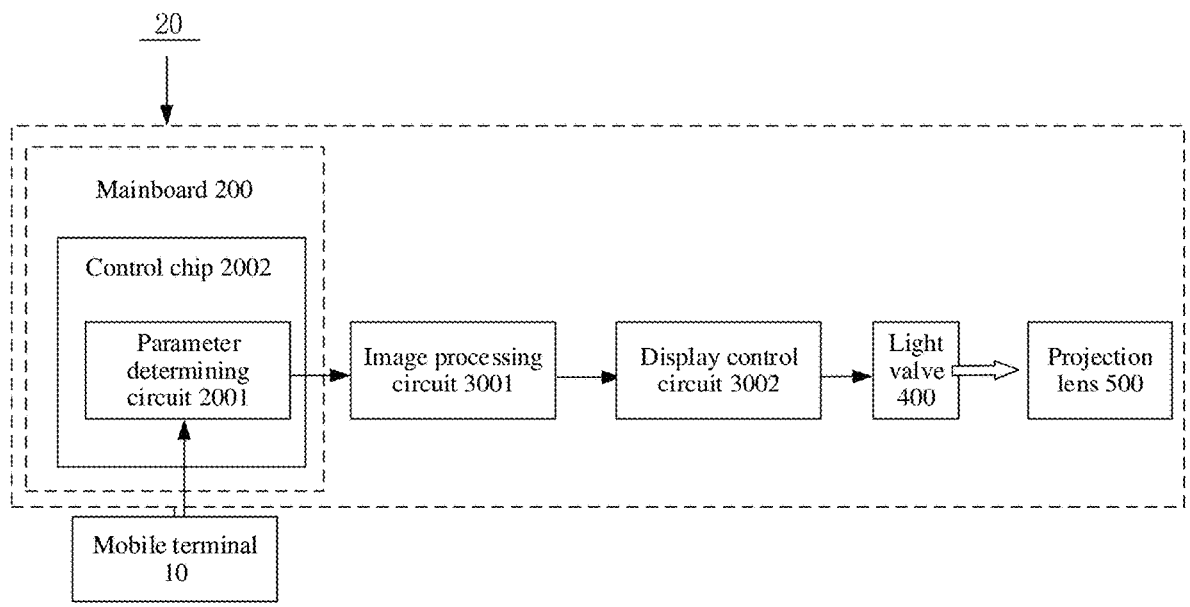
FIG. 13 is a schematic structural diagram of a laser projection device according to some embodiments of the present disclosure.

FIG. 13 is a schematic structural diagram of a laser projection device according to some embodiments of the present disclosure. As shown in FIG. 13, the laser projection device 20 includes a parameter determining circuit 2001, an image processing circuit 3001, a display controlling circuit 3002, a light valve 400, and a projection lens 500. The parameter determining circuit 2001 is integrated in a control chip 2002 of a mainboard 200. In some embodiments, the control chip 2002 is a system on chip (SoC).

The parameter determining circuit 2001 is connected to the image processing circuit 3001, and is configured to determine correction parameters based on the shot image and send the correction parameters to the image processing circuit 3001.

In the embodiments of the present disclosure, upon displaying the projected image on the projection screen, the shooting device acquires the shot image by shooting the projection screen and the projected image, and sends the shot image to the parameter determining circuit 2001 in the laser projection device. The parameter determining circuit 2001 determines the correction parameters based on the shot image.

In the case that the projected image includes a plurality of feature graphical elements arranged in an array, colors of the plurality of feature graphical elements are the same, and a color of each feature graphical element is different from a background color of the projected image, for example, the projected image is the projected image 00 shown in FIG. 4, the correction parameters include correction positions of the plurality of vertexes in the projected image for display.

In the case that the projected image is a checkerboard image, for example, the projected image is the projected image 00 shown in FIG. 5, the correction parameters include correction positions of the plurality of pixel regions in the projected image for display.

The image processing circuit 3001 is connected to the display controlling circuit 3002, and is configured to correct the projected image for display based on the correction parameters and send the corrected projected image for display to the display controlling circuit 3002.

The display controlling circuit 3002 is configured to generate a light valve control signal based on the corrected projected image for display, control the light valve 400 based on the light valve control signal to moderate a beam irradiated to a surface of the light valve 400 to an image beam, and control the light valve 400 based on the light valve control signal to project the image beam to the projection lens 500.

The projection lens 500 is configured to send the image beam to the projection screen to correct the projection position of the corrected projected image for display in the projection screen.

Upon receiving the corrected projected image for display from the image processing circuit 3001, the display controlling circuit 3002 generates a light valve control signal based on the corrected projected image for display, and controls the light valve 400 based on the light valve control signal. The light valve 400 moderates a beam irradiated to a surface of the light valve 400 to an image beam under the control of the light valve control signal, and sends the image beam to the projection lens 500. The projection lens 500 sends the image beam from the light valve 400 to the projection screen, such that the projection position of the corrected projected image for display in the projection screen is corrected, and the projection position of the projected image for display in the projection screen is corrected.

In summary, the laser projection device is provided in the embodiments of the present disclosure. As the image processing circuit corrects the projected image for display based on the correction parameters determined by the parameter determining circuit, such that display controlling circuit projects the corrected projected image for display to the projection screen. Thus, the projected image for display is corrected, the projected image is prevented from being beyond the projection screen, or the projected image displayed on the projection screen is prevented from deformation, and the display effect of the projected image is ensured.

In addition, as the parameter determining circuit is integrated in the control chip, the inner structure of the laser projection device is simplified, and the integration of the laser projection device is improved.

Figure 14:
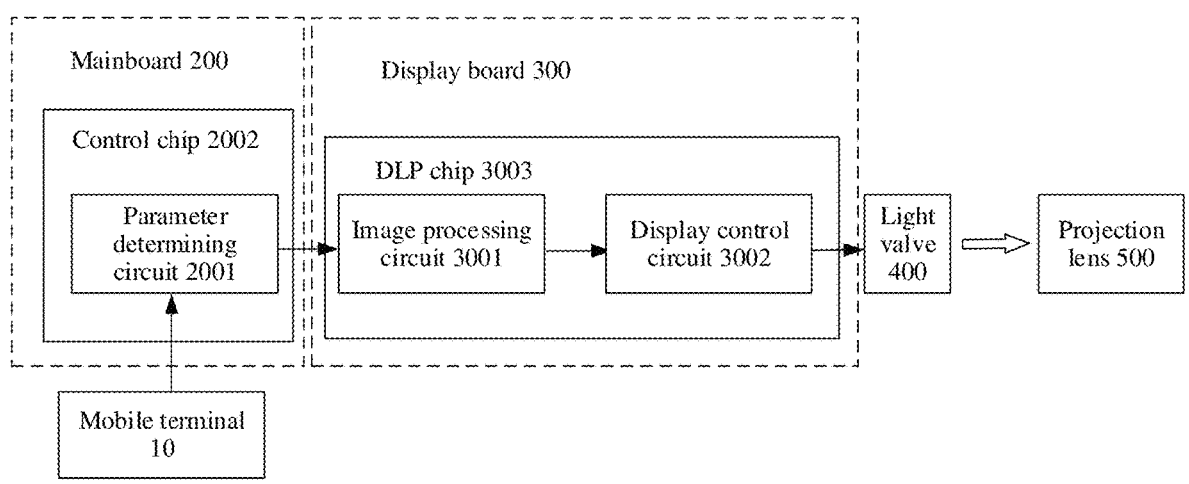
FIG. 14 is a schematic structural diagram of another laser projection device according to some embodiments of the present disclosure.

Referring to FIG. 14, the laser projection device includes a display board 300. The display board 300 includes a digital light processing (DLP) chip 3003, and the image processing circuit 3001 is integrated in the DLP chip 3003.

In some embodiments of the present disclosure, the parameter determining circuit 2001 and the image processing circuit 3001 are connected using a universal serial bus (USB) protocol. In some embodiments, the USB protocol is a USB2.0 protocol, and a transmission rate of the USB2.0 protocol is 60 MB/s. That is, the parameter determining circuit 2001 transmits 60 MB of correction parameters to the image processing circuit per second.

As the parameter determining circuit 2001 and the image processing circuit 3001 are connected using the USB protocol, the parameter determining circuit 2001 transmits a large amount of data (for example, the correction positions of the plurality of pixel regions in the projected image for display) to the image processing circuit 3001 once, such that an efficiency of transmitting the correction parameter is improved, and the efficiency of correcting the projected image is improved.

Figure 15:
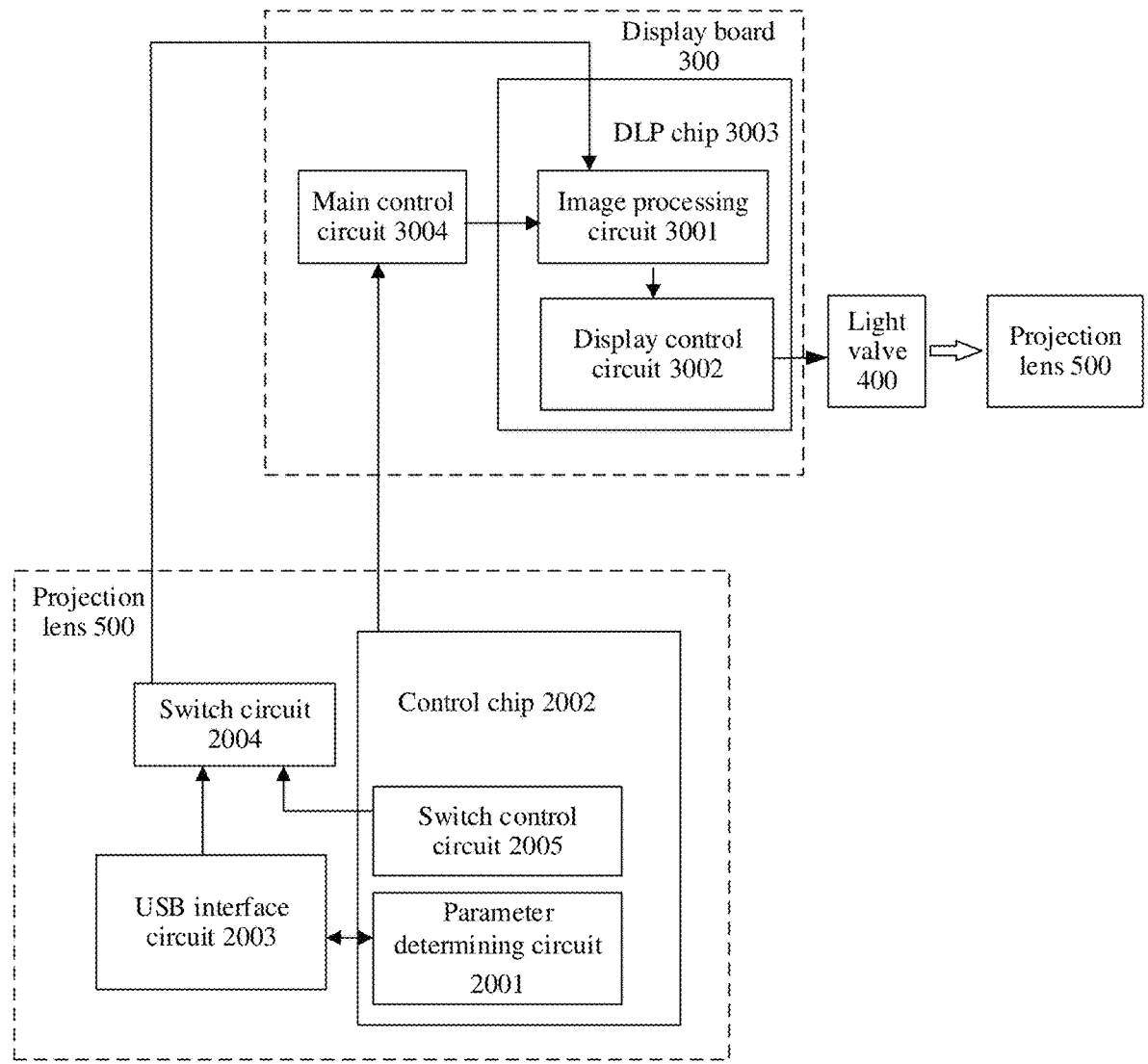
FIG. 15 is a schematic structural diagram of another laser projection device according to some embodiments of the present disclosure.

Referring to FIG. 15, the laser projection device further includes a USB interface circuit 2003, a switch circuit 2004, and a switch control circuit 2005 that are disposed on the mainboard 200. In some embodiments, the USB interface circuit 2003 is a USB hub, and the switch circuit is a USB switch circuit.

The USB interface circuit 2003 is connected to the parameter determining circuit 2001 and a first terminal of the switch circuit 2004, a second terminal of the switch circuit 2004 is connected to the image processing circuit 3001, and a control terminal of the switch circuit 2004 is connected to the switch control circuit 2005.

In some embodiments, the USB interface circuit 2003 is connected to the parameter determining circuit 2001 and the first terminal of the switch circuit 2004 using the USB protocol, and the second terminal of the switch circuit 2004 is connected to the image processing circuit 3001 using the USB protocol.

The parameter determining circuit 2001 is configured to transmit the correction parameter to the USB interface circuit 2003, and the USB interface circuit 2003 is configured to transmit the correction parameter to the switch circuit 2004. The switch circuit 2004 is configured to control the first terminal and the second terminal to be conducted in response to the switch control signal transmitted by the switch control circuit 2005, and transmit the correction parameter to the image processing circuit 3001.

Figure 16:
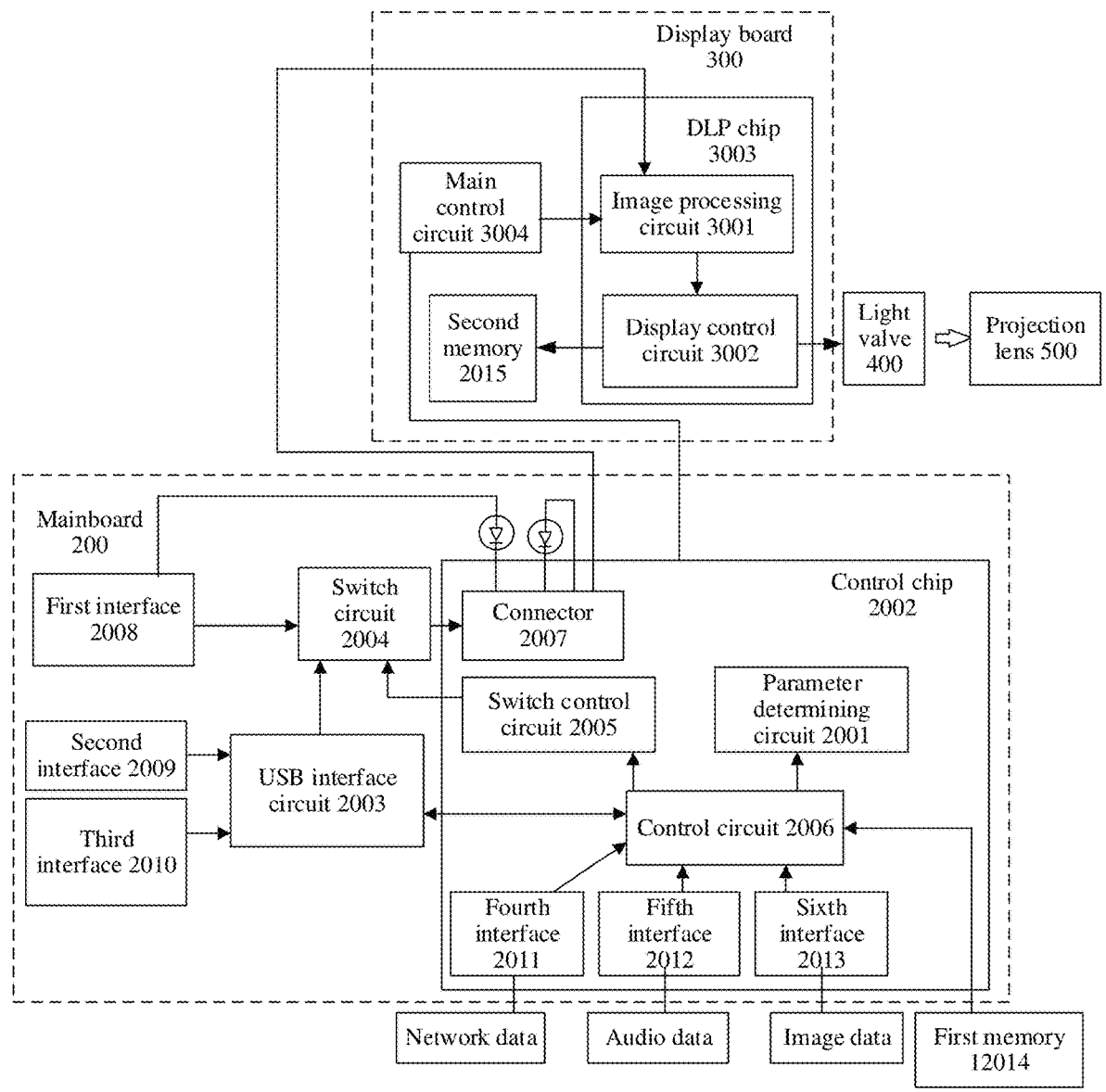
FIG. 16 is a schematic structural diagram of another laser projection device according to some embodiments of the present disclosure.

Referring to FIG. 16, the laser projection device further includes a control circuit 2006 on the mainboard 200, and the control circuit 2006 is connected to the parameter determining circuit 2001, the switch control circuit 2005, and the USB interface circuit 2003. Upon determining the correction parameters, the parameter determining circuit 2001 transmits the correction parameters to the control circuit 2006. Upon receiving the correction parameters, the control circuit 2006 transmits the switch signal to the switch control circuit 2005, such that the switch control circuit 2005 controls the first terminal and the second terminal of the switch circuit 2004 to be conducted in response to the switch control signal. As such, upon transmission of the correction parameters to the switch circuit 2004 by the USB interface circuit 2003, the switch circuit 2004 transmits the correction parameters to the image processing circuit 3001.

Referring to FIG. 16, the laser projection device further includes a connector 2007 on the mainboard 200, and the connector 2007 is connected to the second terminal of the switch circuit 2004 and the image processing circuit 3001 using the USB protocol. The switch circuit 2004 is configured to transmit the correction parameters to the image processing circuit 3001 by the connector.

Referring to FIG. 16, the laser projection device further includes a first interface 2008 on the mainboard 200. One terminal of the first interface 2008 is connected to a third terminal of the switch circuit 2004, and the other terminal of the first interface 2008 is connected to an external device.

The control circuit 2006 is further configured to transmit the control signal to the switch control circuit 2005 upon receiving a connection signal of the external device and the first interface 2008. The switch control circuit 2005 is further configured to control the third terminal and the second terminal of the switch circuit 2004 to be conducted in response to the control signal. The first interface 2008 is configured to transmit data from the external device to the switch circuit 2004. The switch circuit 2004 is configured to control the third terminal and the second terminal to be conducted in response to the switch signal from the switch control circuit 2005, such that data from the external device is transmitted to the image processing circuit 3001.

In the embodiments of the present disclosure, by disposing the switch circuit 2004, the parameter determining circuit 2001 transmits a large amount of correction parameters to the image processing circuit by the switch circuit 2004, such that the efficiency of transmitting the correction parameters is improved.

In some embodiments of the present disclosure, the parameter determining circuit 2001 is connected to the image processing circuit 3001 using an inter-integrated circuit (I2C) protocol. Using the I2C protocol, the parameter determining circuit 2001 transmits less data to the image processing circuit 3001 (for example, the correction positions of the plurality of vertexes in the projected image for display).

Figure 17:
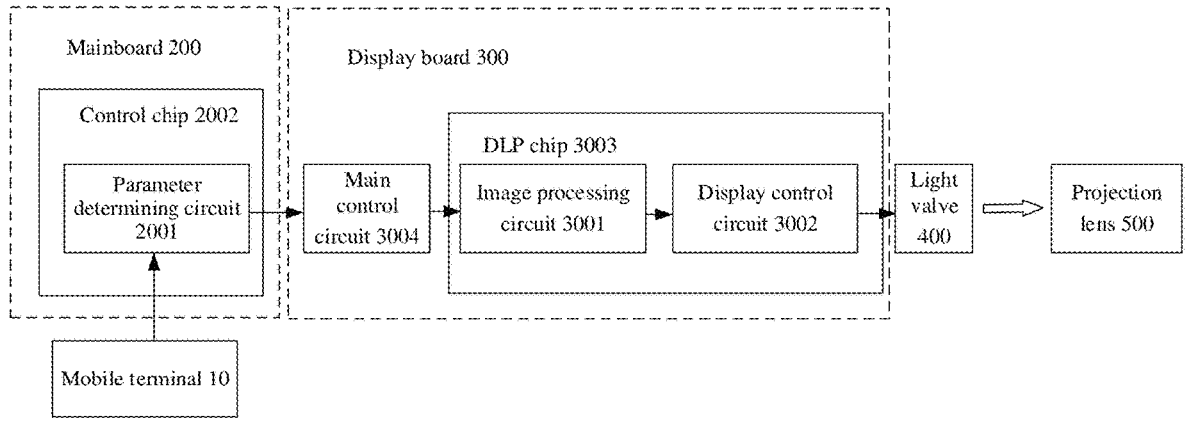
FIG. 17 is a schematic structural diagram of another laser projection device according to some embodiments of the present disclosure.
Figure 18:
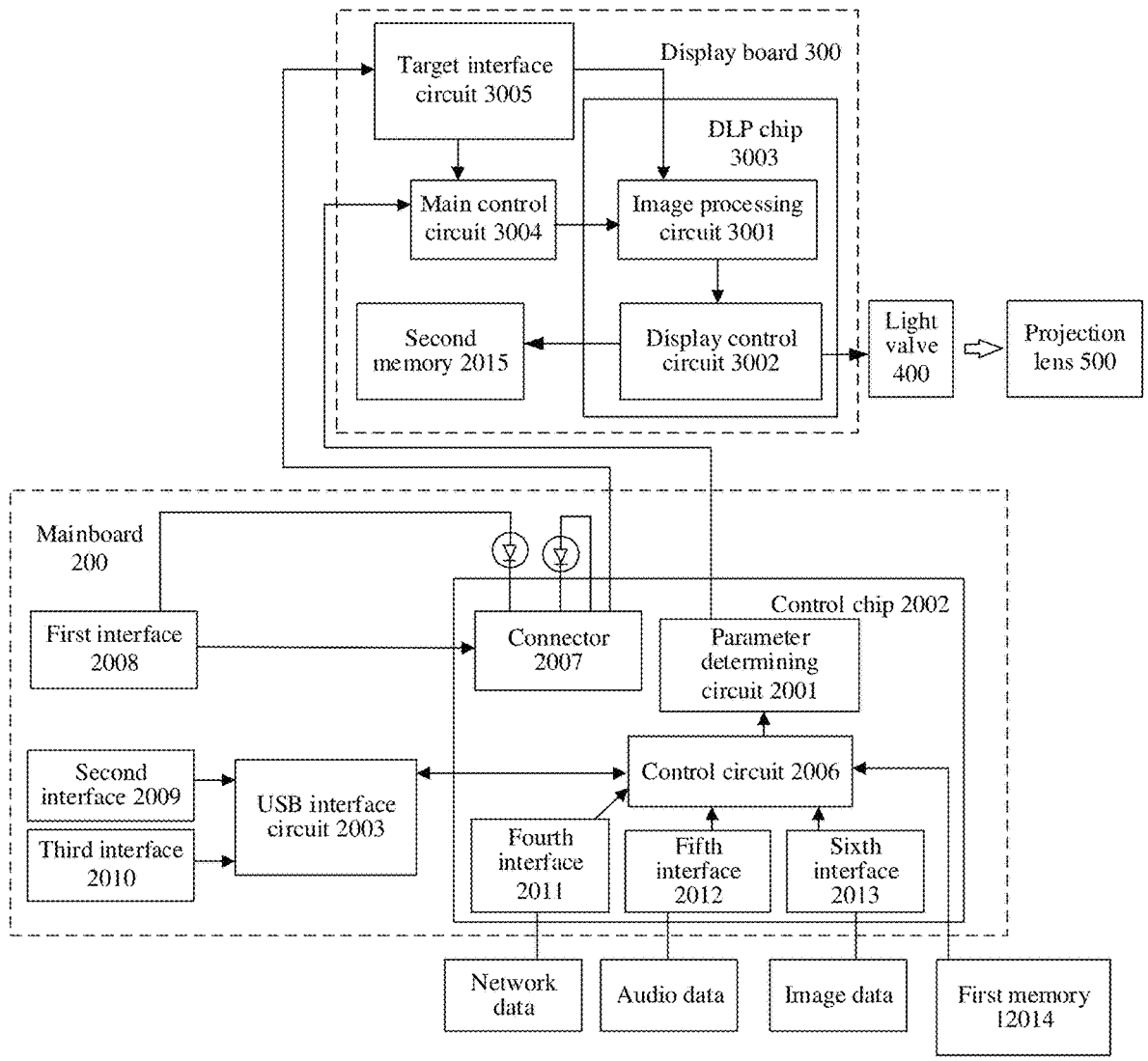
FIG. 18 is a schematic structural diagram of another laser projection device according to some embodiments of the present disclosure.

Referring to FIG. 17 and FIG. 18, the laser projection device further includes a main control circuit 3004 on the display board 300, and the main control circuit 3004 is connected to the parameter determining circuit 2001 and the image processing circuit 3001 using the I2C protocol. The parameter determining circuit 2001 is configured to transmit the correction parameters to the image processing circuit 3001 by the main control circuit 3004. In some embodiments, the main control circuit 3004 is a micro controller unit (MCU).

The parameter determining circuit 2001 is configured to transmit the correction parameters to the main control circuit 3004, such that the main control circuit 3004 transmits the correction parameters to the image processing circuit 3001.

Referring to FIG. 18, the laser projection device further includes a target interface circuit 3005 on the display board 300. One terminal of the target interface circuit 3005 is connected to the connector 2007, and the other terminal of the target interface circuit 3005 is connected to the main control circuit 3004 and the image processing circuit 3001. The target interface circuit 3005 is configured to transmit data from the first interface to the main control circuit 3004 and the image processing circuit 3001. In some embodiments, the target interface circuit 3005 is a USB hub.

Referring to FIG. 16 and FIG. 18, the laser projection device further includes a second interface 2009 and a third interface 2010 on the mainboard 200. One terminal of the second interface 2009 is connected to the USB interface circuit 2003, and the other terminal is connected to the external device. The second interface 2009 is configured to transmit the data from the external device to the control circuit 2006. One terminal of the third interface 2010 is connected to the USB interface circuit 2003, and the other terminal is connected to the external device. The third interface 2010 is configured to transmit the data from the external device to the control circuit 2006.

Referring to FIG. 16 and FIG. 18, the laser projection device further includes a fourth interface 2011, a fifth interface 2012, and a sixth interface 2013 on the mainboard 200. One terminal of the fourth interface 2011 is connected to the control circuit 2006, and the other terminal is in communication with the external device. For example, the communication is a connection over Wi-Fi. Illustratively, the control circuit 2006 is in communication with the shooting device by the fourth interface 2011 over Wi-Fi, and receives network data from the shooting device. For example, the network data is a shot image, and control circuit 2006 further sends the network data to the parameter determining circuit 2001.

A terminal of the fifth interface 2012 is connected to the control circuit 2006, and the fifth interface 2012 is configured to receive audio data and transmit the received audio data to the control circuit 2006.

One terminal of the sixth interface 2013 is connected to the control circuit 2006, and the other terminal of the sixth interface 2013 is in communication with the camera on the projection screen and receives a video image captured by the camera.

Referring to FIG. 16 and FIG. 18, the control circuit 2006 is connected to a first memory 2014, and is configured to receive memory data from the first memory 2014. The laser projection device further includes a second memory 2015. The second memory 2015 is connected to the display control circuit 3002, and the display control circuit 3002 is configured to store pixel values of the pixels in the projected image to the second memory 2015.

In summary, the laser projection device is provided in the embodiments of the present disclosure. As the image processing circuit corrects the projected image for display based on the correction parameters determined by the parameter determining circuit, such that display controlling circuit projects the corrected projected image for display to the projection screen. Thus, the projected image for display is corrected, the projected image is prevented from being beyond the projection screen, or the projected image displayed on the projection screen is prevented from deformation, and the display effect of the projected image is ensured.

In addition, as the parameter determining circuit is integrated in the control chip, the inner structure of the laser projection device is simplified, and the integration of the laser projection device is improved.

The embodiments of the present disclosure provide a shooting device. The shooting device includes a memory, a processor, and computer programs stored on the memory. The process, when running the computer programs, is caused to implement the processes performed by the shooting device in the above method embodiments (any embodiment shown in FIG. 2 or FIG. 3).

The embodiments of the present disclosure provide a laser projection device. The laser projection device includes a memory, a processor, and computer programs stored on the memory. The process, when running the computer programs, is caused to implement the processes performed by the shooting device in the above method embodiments (any embodiment shown in FIG. 2 or FIG. 3).

The embodiments of the present disclosure provide a computer-readable storage medium storing instructions thereon. The instructions, when run by a processor, cause the processor to implement the above method embodiments (any embodiment shown in FIG. 2 or FIG. 3).

The embodiments of the present disclosure provide a computer program product including instructions. The computer program product, when running on a computer, causes the computer to implement the above method embodiments (any embodiment shown in FIG. 2 or FIG. 3).

In the present disclosure, the terms "first" and "second" are configured for descriptive purposes only and are not to be construed as indicating or implying relative importance. The term "a plurality of" refers to two or more, unless specifically defined otherwise.

Described above are merely exemplary embodiments of the present disclosure, and are not intended to limit the present disclosure. Any modifications, equivalent substitutions, improvements, and the like within the spirit and principles of the disclosure are included in the scope of protection of the present disclosure.

The invention claimed is:

1. A method for correcting an image, applicable to a system for correcting an image of a laser projection device, wherein the system for correcting the image comprises a shooting device and the laser projection device, wherein the shooting device comprises a camera, the method comprising:

the shooting device displaying a preview picture, wherein the preview picture at least comprises frames of a projection screen and a projected image;

the shooting device displaying adjustment prompt information in response to at least two of the frames of the projection screen in the preview picture being beyond a target region of the preview picture, wherein the adjustment prompt information is configured to instruct to adjust shooting parameters of the camera;

the shooting device acquiring, in response to a shoot operation, a shot image captured by the camera;

the shooting device sending the shot image to the laser projection device over a wired network or a wireless network; and the laser projection device correcting a projected image for display based on the shot image.

2. The method according to claim 1, wherein the shooting parameters comprise at least one of a distance between the camera and the projection screen and a focal length of the camera.

3. The method according to claim 1, wherein the adjustment prompt information is further configured to indicate that the frames of the projection screen are beyond the target region of the preview picture.

4. The method according to claim 1, further comprising:
the shooting device detecting positions of the frames of the projection screen in the preview picture in response to the preview picture comprising the frames of the projection screen and the projected image.

5. The method according to claim 1, wherein prior to the shooting device acquiring, in response to the shoot operation, the shot image captured by the camera, the method further comprises:
the shooting device displaying shooting prompt information in response to the frames of the projection screen being within the target region, wherein the shooting prompt information is further configured to instruct to shoot the projection screen.

6. The method according to claim 1, further comprising:
the shooting device displaying a shooting prompt box at a target position in the preview picture, wherein the adjustment prompt information is further configured to instruct to move the frames of the projection screen to the target region defined by the shooting prompt box.

7. The method according to claim 6, wherein the target region is a region in the preview picture other than a region defined by the shooting prompt box.

8. The method according to claim 6, wherein the shooting prompt box comprises a first prompt box and a second prompt box surrounding the first prompt box, and the target region is a region between the first prompt box and the second prompt box.

9. The method according to claim 1, further comprising:
the shooting device displaying two parallel shooting reference lines in the preview picture, wherein the adjustment prompt information is further configured to instruct to move the frames of the projection screen to a target region defined by the two shooting reference lines.

10. The method according to claim 9, wherein lengths of the two shooting reference lines are equal, and a distance between the two shooting reference lines is greater than the lengths.

11. A system for correcting an image of a laser projection device, comprising a shooting device and the laser projection device, wherein the shooting device comprises a camera, and is configured to:
display a preview picture, wherein the preview picture at least comprises frames of a projection screen and a projected image;
display adjustment prompt information in response to at least two of the frames of the projection screen in the preview picture being beyond a target region of the preview picture, wherein the adjustment prompt information is configured to instruct to adjust shooting parameters of the camera;
acquire, in response to a shoot operation, a shot image captured by the camera; and
send the shot image to a laser projection device over a wired network or a wireless network;
and the laser projection device is configured to correct a projected image for display based on the shot image.

12. The system for correcting the image according to claim 11, wherein the shooting parameters comprise at least one of a distance between the camera and the projection screen and a focal length of the camera.

13. The system for correcting the image according to claim 11, wherein the adjustment prompt information is further configured to indicate that the frames of the projection screen are beyond the target region of the preview picture.

14. The system for correcting the image according to claim 11, wherein the shooting device is further configured to:
detect positions of the frames of the projection screen in the preview picture in response to the preview picture comprising the frames of the projection screen and the projected image.

15. The system for correcting the image according to claim 11, wherein the shooting device is further configured to:
display shooting prompt information in response to the frames of the projection screen being within the target region, wherein the shooting prompt information is further configured to instruct to shoot the projection screen.

16. The system for correcting the image according to claim 11, wherein the shooting device is further configured to:
display a shooting prompt box at a target position in the preview picture, wherein the adjustment prompt information is further configured to instruct to move the frames of the projection screen to the target region defined by the shooting prompt box.

17. The system for correcting the image according to claim 16, wherein the target region is a region in the preview picture other than a region defined by the shooting prompt box.

18. The system for correcting the image according to claim 16, wherein the shooting prompt box comprises a first prompt box and a second prompt box surrounding the first prompt box, and the target region is a region between the first prompt box and the second prompt box.

19. The system for correcting the image according to claim 11, wherein the shooting device is further configured to:
display two parallel shooting reference lines in the preview picture, wherein the adjustment prompt information is further configured to instruct to move the frames of the projection screen to a target region defined by the two shooting reference lines.

20. The system for correcting the image according to claim 19, wherein lengths of the two shooting reference lines are equal, and a distance between the two shooting reference lines is greater than the lengths.

* * * * *